D. G. Kettell,
Leg-Guard for Harness,
Nº 31,174.    Patented Jan. 22, 1861.
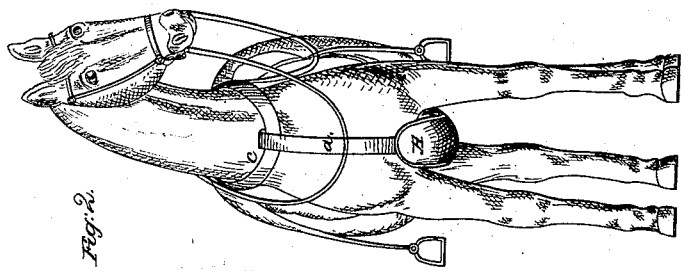
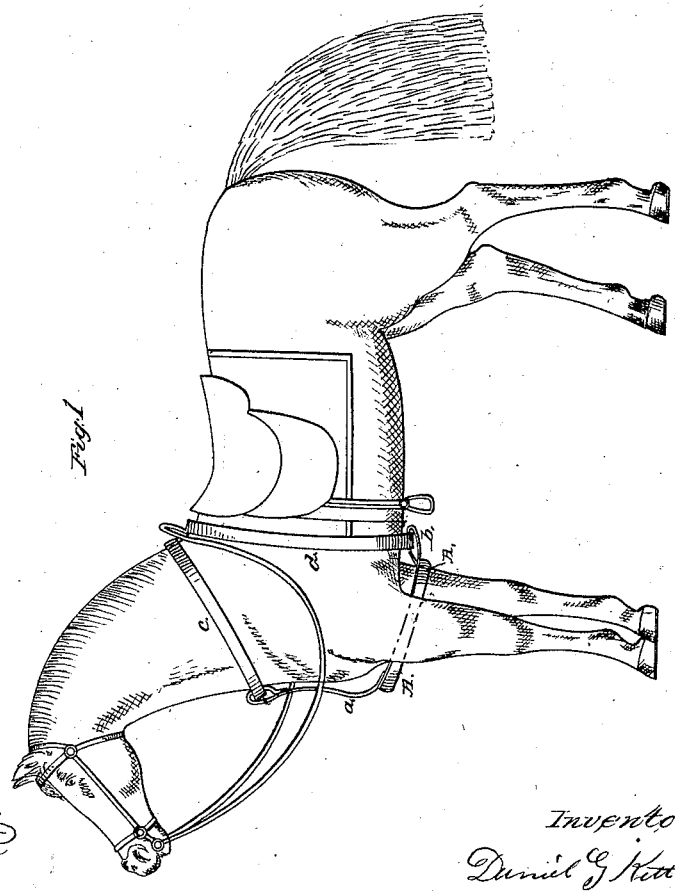
Witnesses
Samuel Smith
Geo. W. Wheeler
Inventor
Daniel G. Kettell

UNITED STATES PATENT OFFICE.

DANIEL G. KETTELL, OF WORCESTER, MASSACHUSETTS.

HARNESS FOR PREVENTING THE FORE LEGS OF HORSES FROM INTERFERING.

Specification of Letters Patent No. 31,174, dated January 22, 1861.

*To all whom it may concern:*

Be it known that I, DANIEL G. KETTELL, of the city and county of Worcester and State of Massachusetts, have made a new and useful invention, the purpose of which is to prevent a horse while traveling from cutting or injuring either fore leg by the hoof or shoe of the other fore leg; and I do hereby declare that the same is fully described and represented in the following specification and the accompanying drawings, of which—

Figure 1, is a side elevation, and Fig. 2, a front view of a horse as furnished with my apparatus for the purpose above mentioned.

It is well known that a horse, while traveling is liable to acquire a habit of occasionally striking and wounding the knee joint or other part of one fore leg by the hoof or shoe of the other. Fast traveling horses and those which while in motion, lift their fore legs high off the ground, are specially subject to such accidents.

The object of my invention is to cure a horse of this bad habit and I accomplish the same by suspending between the legs of the interfering pair an elongated or oval shaped guard, made of wood or other suitable material and being of such a width as while it will not materially interfere with the forward movements of each leg of the horse, will prevent either leg from moving laterally toward the other close enough for its hoof or shoe to come in contact with the flesh of the ankle or knee joint of the latter. The apparatus I adopt or have invented for such purpose, consists of the guard, A, and means of supporting it from the body or the neck and back of a horse. These means as shown in the drawings, consist of two end loops or straps $a$, $b$, and their neck and back loops or straps $c$, $d$. The loop or strap, $c$, goes entirely around the neck of the horse, while the loop or strap, $d$, may, like a common surcingle, be extended about his body, each loop $c$, $d$, going through or being affixed to one of the suspension devices, $a$, $b$, which are to be respectively connected with the opposite extremes of the guard A. The said guard should have its edges rounded and made smooth in order that while being used it may not chafe or injure the horse. A few days' wear of it will generally suffice to cure a horse of the habit of interfering or cutting one leg of a pair with the hoof of the other leg thereof.

The operation of the guard is not to force apart the legs of the horse, but simply to prevent them from contact while he may be traveling, it having been found that by so doing for a few days, the animal not only overcomes the bad habit, above mentioned, but becomes so accustomed to moving each leg wide of the other that he will do so after removal of the guard. The lateral swinging motion of the guard between the legs of the animal while he is traveling will cause such guard to act against the inner parts of the legs in a manner to induce the horse to swing each leg, more or less, laterally away from the other leg, while the former is being moved either forward or backward.

My invention operates in a manner entirely different from that of a pad or buffer strapped to one of the ankles or legs of a horse, as such pad is generally employed to cover the part likely to be wounded, whereas, my apparatus, or the guard thereof is arranged far above the ankle and knee of a horse's leg and is not strapped to either leg. Thus it will not impede the circulation of the blood in the leg as a strap or pad is likely to do when made to encompass the limb.

The operation of my said apparatus is not analogous to that of braces to correct stooping or round shoulders and to throw out the chest of a person, nor is it like that of pads when used in surgery to produce compression or distention for such braces are employed to draw the shoulders backward. The application of a guard as described immediately between the fore legs of a horse and either close up to or a few inches from his breast operates in a novel manner to effect the result of preventing the foot of each fore leg from doing injury to the other leg while the animal may be either walking, trotting or running.

I therefore claim—

A new method substantially as described, of preventing a horse while traveling from injuring one fore leg with the hoof of the other, as well as of breaking the horse of such bad habit, the same being accomplished by a guard arranged and suspended near or close to the breast and between the legs of a horse and to operate as specified.

DANIEL G. KETTELL.

Witnesses:
 Geo. W. Wheeler,
 Samuel Smith.